United States Patent
Macdonald et al.

(10) Patent No.: US 12,530,583 B2
(45) Date of Patent: Jan. 20, 2026

(54) VOLUME PRESERVING ARTIFICIAL NEURAL NETWORK AND SYSTEM AND METHOD FOR BUILDING A VOLUME PRESERVING TRAINABLE ARTIFICIAL NEURAL NETWORK

(71) Applicants: Gordon Macdonald, North Milton (CA); Andrew Godbout, Charlottetown (CA); Bryn Gillcash, Summerside (CA); Stephanie Cairns, Stratford (CA)

(72) Inventors: Gordon Macdonald, North Milton (CA); Andrew Godbout, Charlottetown (CA); Bryn Gillcash, Summerside (CA); Stephanie Cairns, Stratford (CA)

( * ) Notice: Subject to any disclaimer, the term of this patent is extended or adjusted under 35 U.S.C. 154(b) by 287 days.

(21) Appl. No.: 17/096,425

(22) Filed: Nov. 12, 2020

(65) Prior Publication Data

US 2021/0174211 A1    Jun. 10, 2021

Related U.S. Application Data

(60) Provisional application No. 62/936,052, filed on Nov. 15, 2019.

(51) Int. Cl.
*G06N 3/082* (2023.01)
*G06N 3/04* (2023.01)
*G06N 3/084* (2023.01)

(52) U.S. Cl.
CPC ........... *G06N 3/082* (2013.01); *G06N 3/0418* (2013.01); *G06N 3/084* (2013.01)

(58) Field of Classification Search
CPC ................... G06N 3/02–049; G06N 3/08–088
(Continued)

(56) References Cited

U.S. PATENT DOCUMENTS 6,920,423 B2    7/2005  Mueller et al.
9,538,925 B2    1/2017  Sharma et al.
(Continued)

FOREIGN PATENT DOCUMENTS

CN    109492766 A    3/2019
CN    109816789 A    5/2019
WO    2019152308 A1  8/2019

OTHER PUBLICATIONS

Deco et al. "Nonlinear Higher-Order Statistical Decorrelation by Volume-Conserving Neural Architectures", 1995, Neural Networks, vol. 8, No. 4.*
(Continued)

*Primary Examiner* — Michelle T Bechtold
*Assistant Examiner* — Moriam Mosunmola Godo
(74) *Attorney, Agent, or Firm* — Bhole IP Law; Marc Lampert

(57) ABSTRACT

There is provided a volume preserving trainable artificial neural network and a system and a method for building a volume preserving trainable artificial neural network. In an aspect, an artificial neural network including: an input layer to receive input data; one or more sequentially connected hidden layers, the first hidden layer connected to the input layer, to perform operations on the input data, each hidden layer including: one or more volume-preserving rotation sublayers; one or more volume-preserving permutation sublayers; one or more volume-preserving diagonal sublayers; and an activation sublayer; and a downsizing output layer connected to the activation sublayer of the last hidden layer. In some cases, the activation sublayer includes a grouped activation function acting on a grouping of input variables to the activation sublayer.

15 Claims, 12 Drawing Sheets

(58) Field of Classification Search
USPC .................................................. 706/15–44
See application file for complete search history.

(56) References Cited

U.S. PATENT DOCUMENTS

| | | | |
|---|---|---|---|
| 10,635,972 B1* | 4/2020 | Le | G06N 3/0445 |
| 2004/0260476 A1* | 12/2004 | Borgos | G01V 1/301 |
| | | | 702/14 |
| 2017/0185887 A1 | 6/2017 | Droppo et al. | |
| 2017/0286830 A1 | 10/2017 | El-Yaniv et al. | |
| 2018/0121796 A1 | 5/2018 | Deisher et al. | |
| 2018/0260703 A1 | 9/2018 | Soljacic et al. | |
| 2018/0285740 A1 | 10/2018 | Smyth et al. | |
| 2019/0205746 A1 | 7/2019 | Nurvitadhi et al. | |
| 2020/0150892 A1* | 5/2020 | Kim | G06F 3/0655 |
| 2021/0019152 A1* | 1/2021 | Pudipeddi | G06F 9/3877 |
| 2021/0088784 A1* | 3/2021 | Whitmire | G02B 27/0101 |
| 2021/0232851 A1* | 7/2021 | Redford | G06F 18/2115 |

OTHER PUBLICATIONS

Grinshpan "A note on Chebyshev Polynomials and Finite Difference Wave Equation", 2009, Mathematics Subject Classification, retrieved from: https://web.archive.org/web/20090424032102/https://www.math.drexel.edu/~tolya/cpfdwe_c.pdf.*

Tang et al. "ChebNet: Efficient and Stable Constructions of Deep Neural Networks with Rectified Power Units using Chebyshev Approximation." Nov. 7, 2019, arXiv:1911.05467v1.*

Cheung et al. ("Superposition of many models into one." Advances in neural information processing systems. arXiv:1902.05522v2 [cs.LG] Jun. 17, 2019) (Year: 2019).*

Unterthiner et al. ("Understanding very deep networks via volume conservation." (2016) (Year: 2016).*

Li et al. ("Complex-Chebyshev functional link neural network behavioral model for broadband wireless power amplifiers." IEEE Transactions on Microwave Theory and Techniques 60.6 (2012) (Year: 2012).*

Wisdom, et al., "Full-Capacity Unitary Recurrent Neural Networks", arXiv:1611.00035v1 [stat.ML] Oct. 31, 2016.

Arjovsky, Martin, et al., "Unitary evolution recurrent neural networks", vol. 48, 2016, 1120-1128.

Bengio, Yosjua, et al., "Learning long-term dependencies with gradient descent is difficult", IEEE Transactions on Neural Networks, 5(2): 157-166, 1994.

Cho, Kyunghyun, et al., "Learning phrase representations using RNN encoder-decoder for statistical machine translation", arXiv preprint arXiv:1406.1078, 2014.

El-Boustani, Sami, et al., "Locally coordinated synaptic plasticity of visual cortex neurons in vivo", Science, 360 (6395):1349, 2018.

Glorot, Xavier, et al., "Deep sparse rectifier neural networks", In Proceedings of the fourteenth international conference on artificial intelligence and statistics, pp. 315-323, 2011.

Henaff, Mikael, et al., "Recurrent Orthogonal Networks and Long-Memory Tasks", arXiv:1602.06662v2 [cs.NE] Mar. 15, 2017.

Hinton, Geoffrey, et al., "Deep neural networks for acoustic modeling in speech recognition", IEEE Signal processing magazine, 29, 2012.

Hochreiter, Sepp, et al., "Long short-term memory", Neural computation, 9(8):1735-1780, 1997.

Hochreiter, Sepp, "Untersuchungen zu dynamischen neuronalen netzen", Diploma, Technische Universitat Munchen, 91(1), 1991.

Jing, Li, et al., "Tunable efficient unitary neural networks (EUNN) and their application to RNNs", In Proceedings of the 34th International Conference on Machine Learning—vol. 70, pp. 1733-1741. JMLR. org, 2017.

Krizhevsky, Alex, et al., "Imagenet classification with deep convolutional neural networks.", In Advances in neural information processing systems, pp. 1097-1105, 2012.

Maas, Andrew L, et al., "Learning word vectors for sentiment analysis.", In Proceedings of the 49th annual meeting of the association for computational linguistics: Human language technologies—vol. 1, pp. 142-150. Association for Computational Linguistics, 2011.

Macdonald, Gordon, et al., "Volume—preserving Neural Networks".

Nair, Vinod, et al., "Rectified linear units improve restricted Boltzmann machines.", In Proceedings of the 27th international conference on machine learning (ICML-10), pp. 807-814, 2010.

Schmidhuber, Jurgen, "Deep learning in neural networks: An overview.", Neural networks, 61: 85-117, 2015.

Schmidhuber, Jurgen, "Learning complex, extended sequences using the principle of history compression", Neural Computation, 4(2):234-242, 1992.

Unterthiner, Thomas, et al., "Understanding very deep networks via vol. conservation", Workshop track—ICLR 2016.

* cited by examiner

VOLUME PRESERVING ARTIFICIAL NEURAL NETWORK AND SYSTEM AND METHOD FOR BUILDING A VOLUME PRESERVING TRAINABLE ARTIFICIAL NEURAL NETWORK

TECHNICAL FIELD

The following relates generally to artificial neural networks and more specifically to a volume preserving artificial neural network and a system and method for building a volume preserving trainable artificial neural network.

BACKGROUND

Deep neural networks (NN) are generally recognized as a powerful tool for deep machine learning. Deep neural networks are generally characterized by the composition of a large number of functions (referred to as "layers"); each typically consisting of an affine transformation followed by a non-affine "activation function". Generally, each layer is determined by a number of parameters which are trained on data to approximate some function. The 'deepness' refers to the number of such functions composed (or the number of layers). As a non-limiting rule of thumb, any network with more than three layers is generally considered deep, and any network with more than ten layers is generally considered very deep.

Deep neural networks are applicable to address any number of difficult machine learning problems; for example, image recognition, speech recognition, and natural language processing.

SUMMARY

In an aspect, there is provided a trainable artificial neural network executable on one or more computer processors, the artificial neural network comprising: an input layer to receive input data; one or more sequentially connected hidden layers, the first hidden layer connected to the input layer, to perform operations on the input data, each hidden layer comprising: one or more volume-preserving rotation sublayers; one or more volume-preserving permutation sublayers; one or more volume-preserving diagonal sublayers; and an activation sublayer; and a downsizing output layer connected to the activation sublayer of the last hidden layer.

In a particular case of the trainable artificial neural network, each of the volume-preserving rotation sublayers comprises rotation matrices that each rotate a vector in a counter-clockwise direction.

In another case of the trainable artificial neural network, each of the volume-preserving permutation sublayers comprise a permutation matrix that is chosen randomly prior to training of the trainable artificial neural network.

In yet another case of the trainable artificial neural network, each of the volume-preserving diagonal sublayers comprises a diagonal matrix comprising diagonal entries that are positive and have a product equal to one.

In yet another case of the trainable artificial neural network, each of the volume-preserving diagonal sublayers comprises trainable parameters, where each trainable parameter is involved in two neuron connections and where each input neuron connects to one output neuron.

In yet another case of the trainable artificial neural network, the number of rotations or permutations used in any of the hidden layers is $k=2\lceil \log_2(n_{in})\rceil$, where $n_{in}$ is the number of inputs to the hidden layer.

In yet another case of the trainable artificial neural network, the activation sublayer comprises a grouped activation function acting on a grouping of input variables to the activation sublayer.

In yet another case of the trainable artificial neural network, the grouped activation function comprises a coupled Chebyshev activation function.

In yet another case of the trainable artificial neural network, the coupled Chebyshev activation function is implemented with a reflection function.

In yet another case of the trainable artificial neural network, the one or more volume-preserving rotation sublayers, the one or more volume-preserving permutation sublayers, and the one or more volume-preserving diagonal sublayers combine to perform a volume-preserving linear transformation V given by: $V=(\Pi_{j=1}^{k/2} R_j Q_j) D (\Pi_{j=k/2+1}^{k} R_j Q_j)$; where D is a diagonal matrix used in the diagonal sublayers, Q is a permutation matrix used in the permutation sublayers, R is a rotation matrix used in the rotation matrix, and k is the number of rotations or permutations used in each of the hidden layers, where $k=2\lceil \log_2(n_{in})\rceil$ and $n_{in}$ is the number of inputs to the hidden layer.

In another aspect, there is provided a system for building a trainable artificial neural network, the system comprising one or more processors in communication with a data storage, the one or more processors configured to execute: an input module to receive input data with an input layer of the trainable artificial neural network; a transformation module to use one or more sequentially connected hidden layers to perform operations on the input data, the first hidden layer connected to the input layer, each hidden layer comprising: one or more volume-preserving rotation sublayers; one or more volume-preserving permutation sublayers; one or more volume-preserving diagonal sublayers; and an activation sublayer; and an output module to use a downsizing output layer connected to the activation sublayer of the last hidden layer to output the output of the trainable artificial neural network.

In a particular case of the system, each of the volume-preserving rotation sublayers comprises rotation matrices that each rotate a vector in a counter-clockwise direction.

In another case of the system, each of the volume-preserving permutation sublayers comprise a permutation matrix that is chosen randomly prior to training of the artificial neural network.

In yet another case of the system, each of the volume-preserving diagonal sublayers comprises a diagonal matrix comprising diagonal entries that are positive and have a product equal to one.

In yet another case of the system, each of the volume-preserving diagonal sublayers comprises trainable parameters, where each trainable parameter is involved in two neuron connections and where each input neuron connects to one output neuron.

In yet another case of the system, the number of rotations or permutations used in any of the hidden layers is $k=2\lceil \log_2(n_{in})\rceil$, where $n_{in}$ is the number of inputs to the hidden layer.

In yet another case of the system, the activation sublayer comprises a grouped activation function acting on a grouping of input variables to the activation sublayer.

In yet another case of the system, the grouped activation function comprises a coupled Chebyshev activation function.

In yet another case of the system, the coupled Chebyshev activation function is implemented with a reflection function.

In yet another aspect, there is provided a trainable artificial neural network executable on one or more computer processors, the artificial neural network comprising: an input layer to receive input data; one or more sequentially connected hidden layers, each hidden layer comprising a grouped activation function acting on a grouping of input variables to the activation sublayer; and an output layer connected to the activation sublayer of the last hidden layer.

These and other aspects are contemplated and described herein. It will be appreciated that the foregoing summary sets out representative aspects of the embodiments and assists skilled readers in understanding the following detailed description.

DESCRIPTION OF THE DRAWINGS

A greater understanding of the embodiments will be had with reference to the Figures, in which.

DETAILED DESCRIPTION

Figure 1:
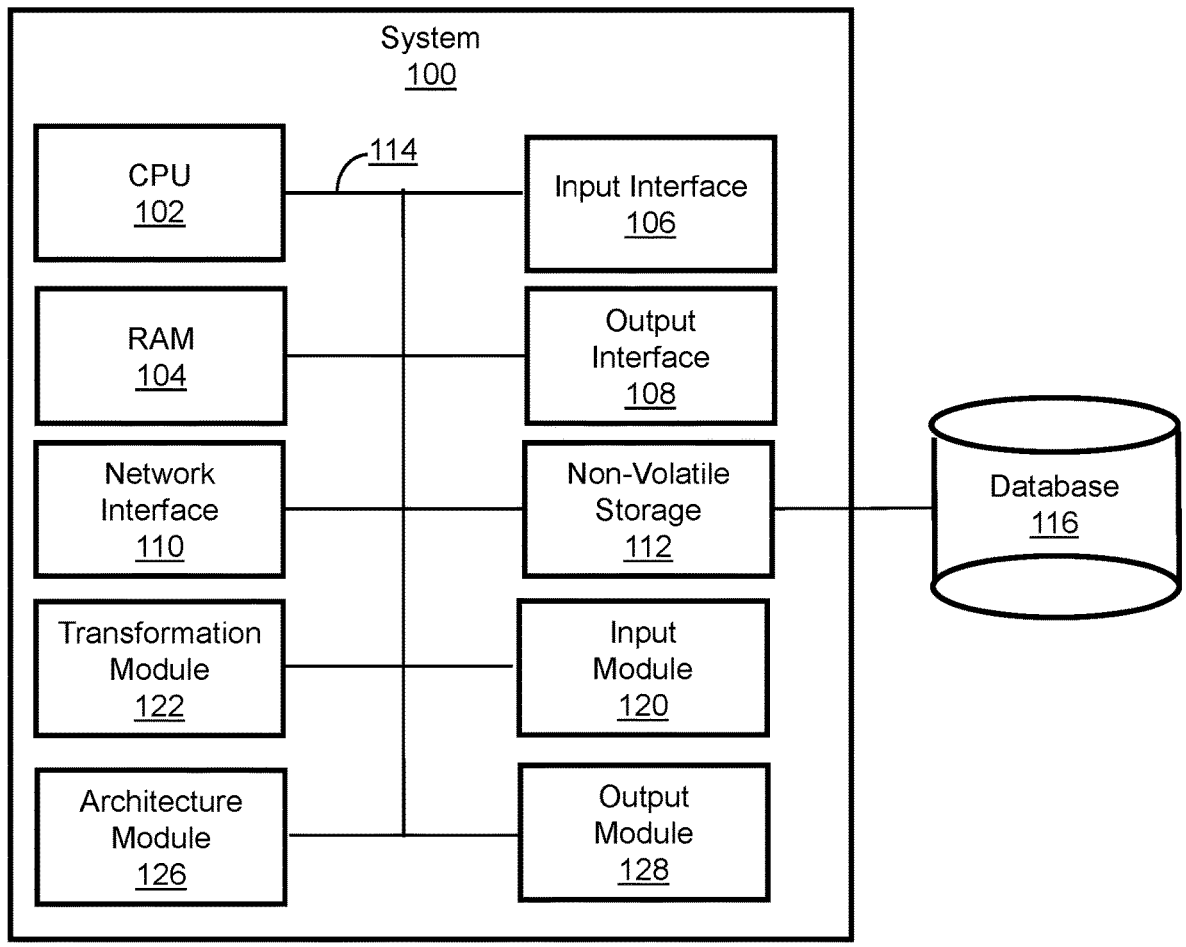
FIG. 1 is a schematic diagram of a system for building a volume preserving trainable artificial neural network, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

The following relates generally to artificial neural networks and more specifically to a system and method for building a volume preserving neural network. Particularly, the embodiments described herein provide an approach to addressing the vanishing (or exploding) gradient problem in deep neural networks. An architecture for deep neural networks is provided where the layers (except the output layer) of the network are a combination of, for example, rotation, permutation, diagonal, and activation sublayers; which are all volume preserving. This control on the volume can force gradients (on average) to maintain equilibrium and not explode or vanish. Advantageously, the volume-preserving neural networks described herein train reliably, quickly, and accurately, and the learning rate is consistent across layers in deep volume-preserving neural networks.

In deep neural networks, for example trained via gradient descent with backpropagation, the problem of vanishing gradients makes it substantially difficult to train the parameters of the network. The backpropagation functions, via the chain rule, multiply a large number of derivatives in deep networks. If too many of these derivatives are small, the gradients vanish, and little learning happens in early layers of the network. In general, there are two main contributors to small derivatives: activation functions that often squash vectors and thus have small derivatives on a large portion of their domain; and weight matrices that act compressively on large parts of their domain. There are various approaches directed to addressing the vanishing gradient problem; for example, by modifying how the activation functions or weight matrices act, or by adding additional features to compensate for the loss of gradients, or a combination of both. These techniques may include using alternative activation functions (such as ReLU), alternative weight matrices (such as unitary matrices), multi-level hierarchies, long short-term memory (LSTM) units, and gated recurrent units (GRU). Despite these approaches, the issue of vanishing and exploding gradients is still a substantial problem for many deep neural networks. With recurrent neural networks, the vanishing and exploding gradient problem is particularly acute because such networks need to be deep to handle long-term dependencies.

The present embodiments provide a volume preserving neural network (VPNN) to address either or both of the two main sources of vanishing gradients: the activation functions and the weight matrices. For example, replacing them with variants that are volume preserving. Enforcing volume preservation ensures that gradients cannot universally vanish or explode. In some cases, the weight matrix is replaced by a product of rotation, permutation, and diagonal matrices, all of which are volume preserving. In some cases, the entrywise-acting activation functions are replaced by coupled activation functions that act pairwise on entries of an input vector (rather than entrywise) and allow the use a wider selection of activation functions; ones that can "squash" while still being volume preserving.

Volume preserving, as referred to herein, is defined such that a function $f: \mathbb{R}^n \to \mathbb{R}^n$ is volume preserving if vol $(f^{-1}(S))$=vol $(S)$ for all measurable sets $S \subset \mathbb{R}^n$; where vol(•) is the volume of a set (e.g., Lebesgue volume).

An L layer VPNN can take $n_{in}$ inputs, process them through L−1 volume-preserving layers (the input layer and the hidden layers) and an output layer to produce $n_{out}$ outputs. Each volume-preserving layer (for l=1, 2, . . . , L−1) is of the form:

$$x \to A(V^{(l)} x + b^{(l)})$$

where $V^{(l)}$ is a volume-preserving linear transformation, $b^{(l)}$ is a bias vector, and A is a volume-preserving coupled activation function. Being volume preserving implies being dimension preserving. Thus, in L−1 volume-preserving layers, $V^{(l)}$ is an $n_{in} \times n_{in}$ matrix, $b^{(l)}$ is a vector in $\mathbb{R}^{n_{in}}$, and A is a function from $\mathbb{R}^{n_{in}}$ to itself. In most cases, the L-th layer (the output layer) is not volume preserving as it must downsize to a size of a classifier space. In an example VPNN, a fixed $n_{out} \times n_{in}$ matrix Z has an output layer defined as:

$$x \to Zx.$$

Figure 2:
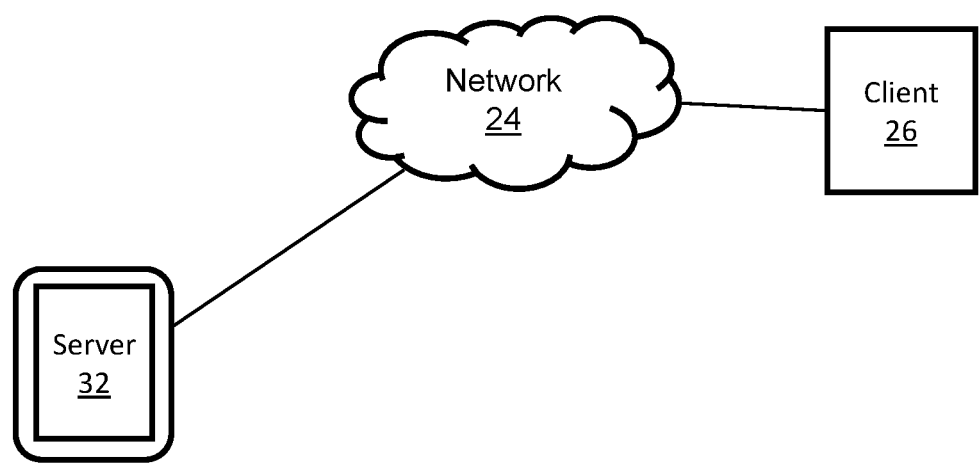
FIG. 2 is a schematic diagram showing the system of FIG. 1 and an exemplary operating environment.

Referring now to FIG. 1 and FIG. 2, a system 100 for building a trainable artificial neural network, in accordance with an embodiment, is shown. In this embodiment, the system 100 is run on a client side device 26 and accesses content located on a server 32 over a network 24, such as the internet. In further embodiments, the system 100 can be run on any suitable computing device; for example, a desktop computer, a laptop computer, a smartphone, a tablet computer, the server 32, distributed or cloud computing device(s), or the like. In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, an input interface 106, an output interface 108, a network interface 110, non-volatile storage 112, and a local bus 114 enabling CPU 102 to communicate with the other components. CPU 102 executes an operating system, and various conceptual modules, as described below in greater detail. RAM 104 provides relatively responsive volatile storage to CPU 102. The input interface 106 enables an administrator or user to provide input via an input device, for example a keyboard and mouse. In other cases, the input data can be already located on the database 116 or received via the network interface 110. The output interface 108 outputs information to output devices, for example, a display. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data can be stored in a database 116. During operation of the system 100, the operating system, the modules, and the related data may be retrieved from the non-volatile storage 112 and placed in RAM 104 to facilitate execution.

In an embodiment, the CPU 102 is configurable to execute a number of conceptual modules, such as an input module 120, a transformation module 122, and an output module 128. In further cases, the functions of any of the modules can be combined, further separated, or run on different modules.

Figure 3:
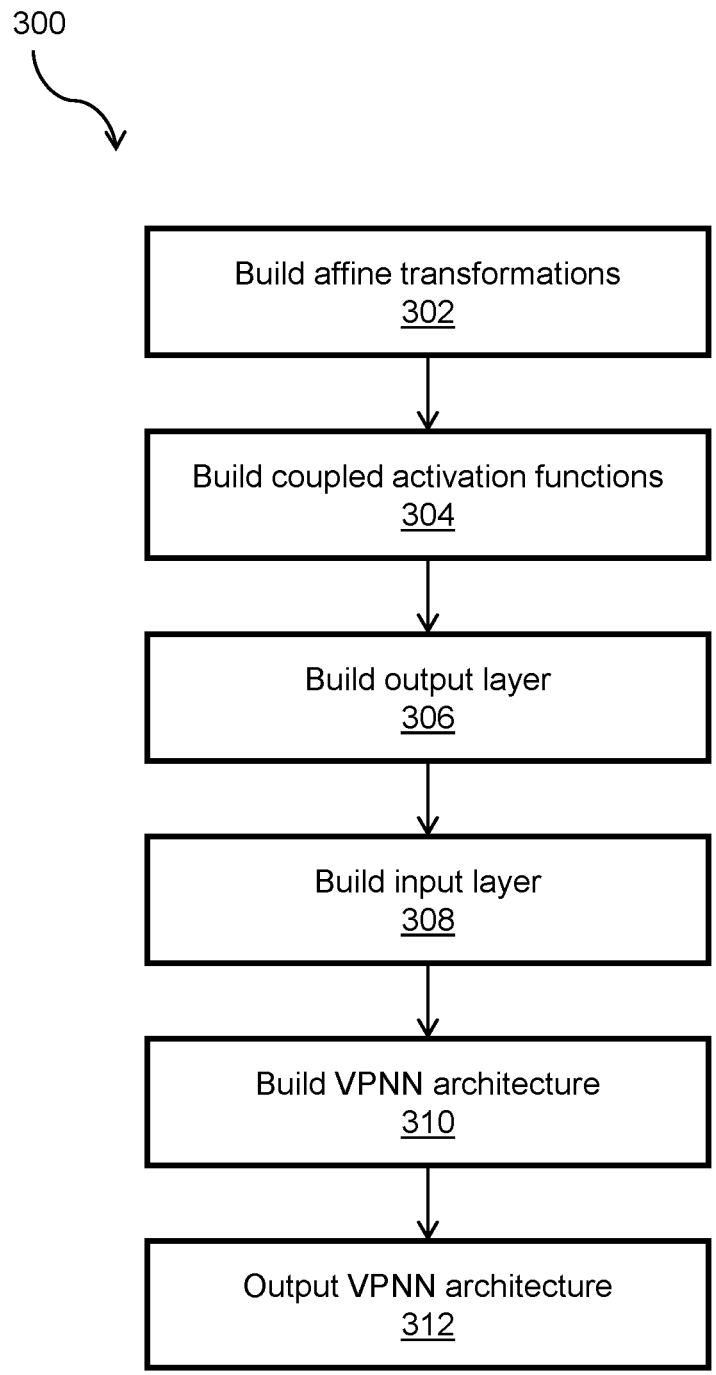
FIG. 3 is a flow chart of a method for building a volume preserving trainable artificial neural network, in accordance with an embodiment.

FIG. 3 illustrates a flowchart for a method of building a trainable artificial neural network 300, in accordance with an embodiment.

At block 302, the transformation module 122 builds V, a volume-preserving linear transformation, as a product of one or more of rotation, permutation, and diagonal matrices.

For rotation matrices, the transformation module 122 sets:

$$R_\theta = \begin{bmatrix} \cos\theta & -\sin\theta \\ \sin\theta & \cos\theta \end{bmatrix},$$

as a rotation matrix that rotates a vector in $\mathbb{R}^2$ by $\theta$ in a counterclockwise direction.

A rotation matrix R for a VPNN corresponds to a direct sum of the above matrices:

$$R = \bigoplus_{i=1}^{n_{in}/2} R_{\theta_i} = \begin{bmatrix} R_{\theta_1} & 0 & 0 & \cdots & 0 \\ 0 & R_{\theta_2} & 0 & \cdots & 0 \\ 0 & 0 & R_{\theta_3} & & \\ \vdots & \vdots & & \ddots & \\ 0 & 0 & & & R_{\theta_{n_{in}/2}} \end{bmatrix}$$

In most cases, there are $n_{in}/2$ trainable parameters in a rotation matrix, where each parameter is involved in four neuron connections and each input neuron connects to two output neurons.

For permutation matrices, the transformation module 122 builds a permutation matrix Q. The matrix Q for a VPNN corresponds to a permutation q of $\{1, 2, 3, \ldots, n_{in}\}$ (a bijection from $\{1, 2, 3, \ldots, n_{in}\}$ to itself); which, in some cases, can be chosen randomly before training begins. The transformation module 122 builds the permutation matrix Q to have (q(i),i) entries (for i=1, 2, . . . $n_{in}$) equal to one and all other entries are zero. In most cases, there are no trainable parameters in a permutation matrix, and each input neuron connects to one output neuron. Advantageously the use of the random permutation eliminates implicit biases of networks to connect neurons to themselves.

For diagonal matrices, the transformation module 122 builds a diagonal matrix D. The diagonal matrix D for a VPNN has diagonal entries that are positive and has a product equal to one. In an example, to stay away from possible "division by zero" problems, the transformation module 122 can implement the diagonal matrix D as:

$$D = \begin{bmatrix} \frac{f(t_1)}{f(t_{n_{in}})} & & & & & \\ & \frac{f(t_2)}{f(t_1)} & & & & \\ & & \ddots & & & \\ & & & \frac{f(t_{n_{in}-1})}{f(t_{n_{in}-2})} & & \\ & & & & \frac{f(t_{n_{in}})}{f(t_{n_{in}-1})} \end{bmatrix}$$

where $f$ is a function from $\mathbb{R}$ to $\mathbb{R}^+$ whose range lies in a compact interval (and all off-diagonal entries are zero). In this example, $f(x)=\exp(\sin x)$; however, any suitable function can be used.

In most cases, there are $n_{in}$ trainable parameters in each diagonal matrix; where each parameter is involved in two neuron connections and each input neuron connects to one output neuron. Parametrizing the diagonal in this way can ensure that it is volume preserving.

In an embodiment, the transformation module 122 can build the volume-preserving linear transformation V as:

$$V = \left(\prod_{j=1}^{k/2} R_j Q_j\right) D \left(\prod_{j=k/2+1}^{k} R_j Q_j\right)$$

The above transformation advantageously mimics singular value decomposition of a general weight matrix, allowing a streamlined neuronal connection structure with little or no loss of approximability and control over the volume to ensure volume preserving.

In most cases, each $R_j Q_j$ connecting two input neurons to two "random" output neurons. The output neurons are random in the sense that the permutation matrices can be selected randomly before training begins, and these matrices determine the output neurons. However, the output neurons are generally no longer random once $Q_j$ is selected. Using $\lceil \log_2(n_{in}) \rceil$, $R_j Q_j$ along with a diagonal matrix can achieve near total neuronal interaction in each volume-preserving affine layer. In some further cases, a slight improvement in accuracy can be achieved by adding additional rotations and permutations, $R_j Q_j$, to gain redundant neural connections. In this way, in some cases, the transformation module 122 can set k (the number of rotations or permutations used in any layer) to be $$k = 2\lceil \log_2(n_{in}) \rceil$$

The above can ensure that k is even and can also allow there to be the same number of rotations and permutations on each side of the diagonal (however, this is not strictly necessary). In many cases, the more layers in the VPNN, the less pronounced is the effect of adding redundant rotations and permutations, $R_j Q_j$, in any layer. In some cases, particularly for very deep networks, taking k closer to $\lceil \log_2(n_n) \rceil$ is more ideal.

Advantageously, the VPNN in the present embodiments can be volume preserving in all layers except the output layer. Rotations, permutations, and translations are generally rigid maps on $\mathbb{R}^n$ and thus leave volume unchanged. The determinant one condition can ensure that the diagonal layer is volume preserving, and the coupled activation maps can also ensure that it is volume preserving. Due to the volume-preserving property, if vectors on the unit ball are passed through a layer, some will be shortened and some lengthened. The unit ball being the set of all vectors of norm less than or equal to one. When passing through multiple hidden layers, it can be expected that, "on average," a vector will be shortened at some layers and lengthened at others. In this way, the vector will generally not have its length vanish or explode; thus, providing some management of the gradient.

After using volume preservation as a control mechanism for the gradient, in some cases, volume-preservation can also be used for the activation functions. Since activation functions are necessarily non-affine, they generally cannot be constructed as functions of only one input variable. In this way, the present inventors determined that coupled activation functions can be used; which take two (or more) inputs. At block 304, the transformation module 122 can build the coupled activation function for the VPNN coupled activation function corresponds to a non-affine function C from $\mathbb{R}^2$ to $\mathbb{R}^2$; which may be area preserving. Instead of the activation functions of other approaches, which act entrywise on the entries of a vector, the transformation module 122 can build a coupled activation function A that acts on a vector x by grouping entries in pairs and applying C to the entries pairwise. In most cases, the vector x has an even number of entries. In an example, a coupled activation sublayer performs:

$$x = \begin{bmatrix} x_1 \\ x_2 \\ \vdots \\ \vdots \\ x_{n-1} \\ x_n \end{bmatrix} \xrightarrow{A} \begin{bmatrix} C\left(\begin{bmatrix} x_1 \\ x_2 \end{bmatrix}\right) \\ \vdots \\ \vdots \\ C\left(\begin{bmatrix} x_{n-1} \\ x_n \end{bmatrix}\right) \end{bmatrix}$$

where C can be any suitable coupled activation function; for example, a coupled Chebyshev function.

In some cases, the coupled activation function can be described in polar coordinates. Given a point (x,y) in the plane, if r is the distance from that point to (0,0) and $-\pi < \theta \leq \pi$ is the angle of the ray from (0,0) to (x,y) makes with the positive x axis, then $r = \sqrt{x^2 + y^2}$ and $$\theta = \text{sgn}(y) \cos^{-1}\left(\frac{x}{\sqrt{x^2+y^2}}\right)$$

are the polar coordinates of (x,y). A contractive factor M can be introduced, and thus:

$$C_M(r, \theta) = \left(\frac{r}{\sqrt{M}}, M\theta\right)$$

Such that the radius r is contracted by $\sqrt{M}$ and the angle $\theta$ is increased by a factor of M. The area unit for polar coordinates is $dA = r \, dr \, d\theta$, and as such:

$$d(C_M(A)) = \frac{r}{\sqrt{M}} \frac{\partial C_M}{\partial r} \frac{\partial C_M}{\partial \theta} dr \, d\theta = \frac{r}{\sqrt{M}} \frac{1}{\sqrt{M}} M \, dr \, d\theta = r \, dr \, d\theta$$

Converting to Cartesian coordinates:

$$C_M\left(\begin{bmatrix} x \\ x \end{bmatrix}\right) = \begin{bmatrix} \frac{\sqrt{x^2+y^2}}{\sqrt{M}} \cos\left(M\cos^{-1}\left(\frac{x}{\sqrt{x^2+y^2}}\right)\right) \\ \frac{\sqrt{x^2+y^2}}{\sqrt{M}} \operatorname{sgn}(y)\sin\left(M\cos^{-1}\left(\frac{x}{\sqrt{x^2+y^2}}\right)\right) \end{bmatrix}$$

In some embodiments, the above can be used as the coupled activation function; in some cases, with a value of M in the range (1,2]. In the case where M is an even integer, these can be related to the Chebyshev polynomials:

$$C_M\left(\begin{bmatrix} x \\ x \end{bmatrix}\right) = \begin{bmatrix} \frac{\sqrt{x^2+y^2}}{\sqrt{M}} T_M\left(\frac{x}{\sqrt{x^2+y^2}}\right) \\ \frac{|y|}{\sqrt{M}} U_{M-1}\left(\frac{x}{\sqrt{x^2+y^2}}\right) \end{bmatrix}$$

where $T_n$ is Chebyshev polynomial of the first kind, and $U_n$ is Chebyshev polynomial of the second kind:

$$T_n(x) = \cos(n\cos^{-1}(x)) \text{ and } U_n(x) = \frac{\cos(n\sin^{-1}(x))}{\sin(\cos^{-1}(x))}$$

For illustration, in the case where M=2, these can take the form:

$$C_2\left(\begin{bmatrix} x \\ x \end{bmatrix}\right) = \begin{bmatrix} \frac{x^2-y^2}{\sqrt{2}\sqrt{x^2+y^2}}, \frac{\sqrt{2}x|y|}{\sqrt{x^2+y^2}} \end{bmatrix}$$

In some cases, when used in conjunction with non-volume-preserving layers (for example, as the activation function in an otherwise fully-connected neural network), the Chebyshev coupled activation function can be compressive (volume reducing) or expansive (volume increasing) if necessary to make up for any expansion or compression in the weight layers. In some cases, this can be accomplished with a doubly-parameterized coupled Chebyshev activation function. For example, in polar coordinates:

$$C_{(\alpha,\beta)}(r,\theta)=(\alpha r, \beta \theta)$$

where $0<\alpha<1$ (thus, some squashing will be performed on the norms of vectors) and, in some cases, $\beta>1$ (because it may be highly compressive if $\beta \leq 1$).

The area unit for polar coordinates is $dA=r\,dr\,d\theta$, accordingly:

$$d(C_{(\alpha,\beta)}(A))=(\alpha r)(\alpha dr)(\beta d\theta)=(\alpha^2 \beta)dA$$

where $C_{(\alpha,\beta)}$ will be volume preserving if $\alpha^2\beta=1$, compressive if $\alpha^2\beta<1$, and expansive if $\alpha^2\beta>1$.

In Cartesian Coordinates, the formula for $C_{(\alpha,\beta)}$ is:

$$C_{(\alpha,\beta)}\left(\begin{bmatrix} x \\ y \end{bmatrix}\right) = \begin{bmatrix} \alpha\sqrt{x^2+y^2}\cos\left(\beta\cos^{-1}\left(\frac{x}{\sqrt{x^2+y^2}}\right)\right) \\ \sqrt{x^2+y^2}\operatorname{sgn}(y)\sin\left(\beta\cos^{-1}\left(\frac{x}{\sqrt{x^2+y^2}}\right)\right) \end{bmatrix}$$

Like with the singly-parametrized Chebyshev activation function, the doubly-parameterized coupled Chebyshev activation function could be implemented with or without a fold (reflection function) as described herein; which makes it continuous.

In the coupled Chebyshev activation sublayer, in some cases there may be a concern with the possibility of division by zero. In these cases, the transformation module 122 can address this by doing a check of any input (x,y) to a Chebyshev function. If $|x|+|y|<10^{-7}$, the transformation module 122 sets (x,y) to $(10^{-7}, 0)$.

It is appreciated that the coupled activation functions, as referred to herein, can include grouped activation functions made up of any suitable number of groupings of input variables (for example, groupings of 2, 3, 4, or more input variables) that are sent through a corresponding activation function (coupled, tripled, quadrupled activation function, etc.). Whereby the coupled Chebyshev activation function is one such example. The activation functions are generally volume preserving in the context of the VPNN of the present embodiments; however, in further cases, the activation functions can be non-volume preserving.

While the above embodiments describe a volume preserving activation function, it is understood that, in some cases, volume preserving affine transformations can be coupled with non-volume preserving activations (for example, ReLU or non-volume preserving variants of coupled Chebyshev). Additionally, in further cases, coupled activation functions, as described herein, can be applied after non-volume preserving affine transformations (for example, fully connected matrices or convolutional layers); as exemplified in the Mixed1 and Mixed2 models in the example experiments. The coupled activation functions, for example the coupled Chebyshev activation functions, for example when used with non-volume preserving affine transformations, can allow for a wider variety of non-linear activation functions, and thus can be tailored to a particular application. Additionally, such activation functions can have derivatives that do not vanish on any part of their domain; and thus, do not contribute to vanishing gradients in Neural Networks where they are used as activation function. Additionally, such activation functions can be controlled to compensate for weight layers which contribute to vanishing or exploding gradients. For example, if the weight layers are contractive, the coupled activation functions can be chosen or trained to be expansive, and thus, control vanishing gradients. If the weight layers are expansive, the coupled activation functions can be chosen or trained to be contractive, and thus, control exploding gradients. In both cases, or in the case where the coupled activation function is volume preserving, such functions allow for better training of deep Neural Networks than other activation functions, which generally do not have the above advantages.

In some cases, finer control on the weights layer may be required for the VPNN. This can be motivated by Singular Value Decomposition, which states that any square matrix can be written as UDV where U and V are orthonormal (i.e. real unitary) and D is diagonal with non-negative diagonal entries. Any real unitary matrix (of determinant 1) can be written as a product of Givens rotations. Every Givens rotation is of the form $QRQ^{-1}$ for some permutation matrix and some choice of parameters $\theta_L$ (all but one chosen to be zero). Thus, the present inventors determined that it is possible to replace a general weight matrix W by a volume-preserving matrix V of the above form with little impact on the ability of the VPNN to approximate.

At block 306, the output module 128 can build the output layer of the VPNN. Since volume-preserving layers cannot downsize (reduce dimension), the output layer generally needs to map down to the dimension of the classification space. In a particular case, the output module 128 uses no bias on the output layer and fixes a "random" matrix Z of size $n_{out} \times n_{in}$ with $ZZ^T=1$ and with most entries non-zero and of roughly equal magnitude. This type of layer can preserve length and connect output neurons in the output layer to input neurons with roughly the same weight. Then, the output layer includes:

$$x \rightarrow Zx$$

In the above case, the output module 128 selects a random initialization of a weight matrix Z, but does not allow the weights to train in the output layer. In some cases, the output module 128 generates the downsizer matrix Z by randomly choosing entries of an $n_{out} \times n_{in}$ matrix A from the interval [−1,1], then applying reduced Singular Value Decomposition to A. In doing so, the output module 128 obtains $A=U\Sigma V^T$; where Z=U has the desired properties.

In further cases, the output module 128 can build the output layer with any suitable structure; for example, fully connected, pooling, or the like.

In some cases, rotation matrices of the form $QRQ^{-1}$ can be used; where Q is a permutation matrix (rather than the RQ structure). In that case, standard axes are randomly paired off and rotated in standard planes. RQ can be used over $QRQ^{-1}$ in order to avoid a built-in predisposition in the neural network for neurons to link to themselves across layers. The rotation matrices (as well as the coupled activation sublayers) can connect two input neurons to two output neurons, with one of the two output neurons being one of the input neurons. It was determined that, in practice, the choice of QR rather than $QRQ^{-1}$ can provide noticeable improvements in accuracy.

Sometimes, activation functions are referred to as squashing functions. Functions like sigmoid and hyperbolic tangent "squash" the real line into a bounded interval. Functions like ReLU squash all negative inputs to zero. This ability to squash can be a useful feature in activation functions but is also one source of the vanishing gradient problem. The coupled Chebyshev activation function is volume preserving, but by giving up a bit of one-to-oneness, also squashes the length of input vectors. The consistency of its squashing has been determined by the present inventors to provide better performance than other coupled activation functions (for example, shears).

In a particular case, the number of trainable parameters in each of the first L−1 layers of an embodiment of the VPNN is $n_{in}(\lceil \log_2 n_{in} \rceil + 2)$; where $n_{in}$ is the number of entries in the input vector to the neural network ($n_{in} \lceil \log_2 n_{in} \rceil$ from rotations, $n_{in}$ from diagonals, and $n_{in}$ from biases). This is advantageous when contrasted to $n_{in}^2 + n_{in}$ in other neural networks (or even greater if there was upsizing).

In some cases, at block 308, the input module 120, at the input layer to the VPNN, can scale input vectors so that their length is within the same order of magnitude of the output vectors; which, in most cases, should have length 1 if the network is learning correctly. In some cases, the inputs can be processed by scaling entries so that they lie in some interval (for example, [0,1]) and then divide each entry by $\sqrt{n_{in}}$ (where $n_{in}$ is the number of entries), so that the length of an input vector is reasonably close to 1. This preprocessing can be beneficial for the VPNN because any stretching or compressing should generally be performed in the diagonal and activation layers, and it is generally not desirable to impose extra work on these layers to scale vectors up or down beyond what is needed for approximation.

Figure 4:
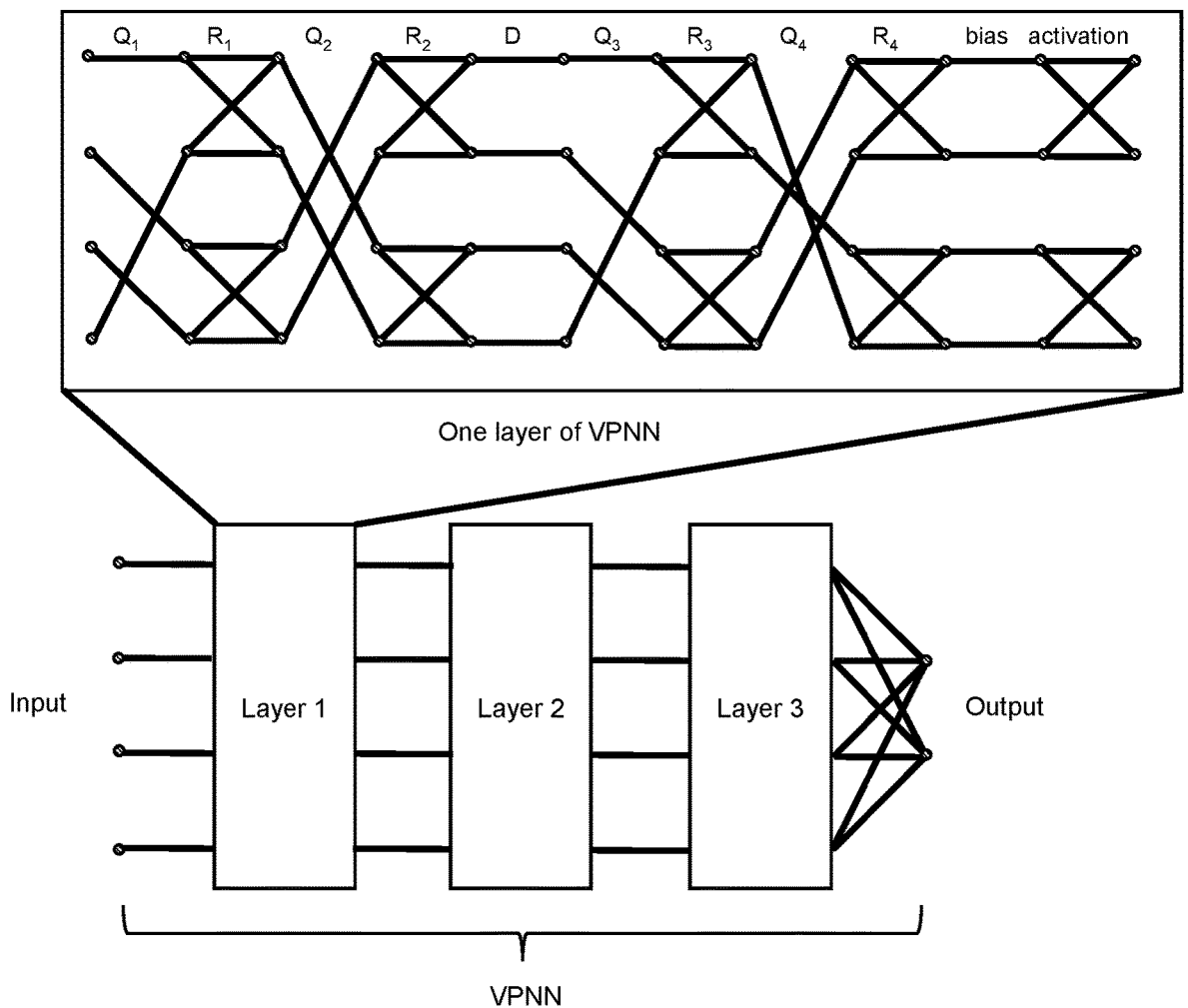
FIG. 4 is a diagram of an example of an architecture for a volume-preserving neural network (VPNN)

At block 310, the architecture module 130 builds the VPNN architecture comprising the input layer, the one or more hidden layers, and the output layer. Each of the one or more hidden layers comprising the transformations determined by the transformation module 122 fed into activations functions determined by the transformation module 122. In some cases, the VPNN has a mostly binary neuron linkage structure. In this structure, each single rotation matrix, and coupled activation function, connects each input neuron to exactly two output neurons; and each diagonal and permutation matrix connects each input neuron to exactly one output neuron. As an example of this structure, FIG. 4 illustrates a diagram of an example architecture of layer and sublayer structure of the VPNN, where there are four input neurons, three hidden layers, and two output neurons.

At block 312, the architecture module 130 outputs the VPNN architecture, for example, to the database 116 or to other systems via the network interface 110. The VPNN architecture can thus be used training and performance of a task; for example, for receiving a training dataset to train a model using the VPNN architecture, which can be then used for pattern and/or prediction analysis.

With respect to other approaches using ReLU activation functions in deep neural networks, notable performance can be achieved due to the fact that ReLU introduces sparsity. Certain neuronal connections are pruned by virtue of having negative inputs into ReLU. In the VPNN of the present embodiments, the advantages of sparsity can be incorporated by a different mechanism, not by pruning, but by building fewer neuronal connections as part of the architecture. Advantageously, in the VPNN architecture, when a neuronal connection (i.e. a parameter in the model) is strengthened in any rotational or diagonal sublayer, nearby neuronal connections will be weakened; which follows how biological neural networks perform. Also advantageously, the VPNN can train more reliably due to the well-behaved nature of the surface of $U_n$ (the unitary n×n matrices), which is moved along in gradient descent in rotational sublayers, making it less likely to get stuck in local minima.

The architecture module 130 can also provide backpropagation for an L layer of the VPNN. Let $\theta_{p,i}^{(l)}$ denote the $i^{th}$ rotational parameter (i=1, 2, ... $n_{in}/2$) in the $p^{th}$ rotation matrix (p=1, 2, ..., k) in the $l^{th}$ layer (l=1, 2, ..., L−1), let $t_j^{(l)}$ denote the $j^{th}$ diagonal parameter in the diagonal matrix $D^{(l)}$ in the $l^{th}$ layer (l=1, 2, ..., L−1), and let $b_j^{(l)}$ denote the $j^{th}$ bias parameter in the bias vector $b^{(l)}$ in the $l^{th}$ layer (l=1, 2, ..., L−1). For a given error function (or cost function) E, the VPNN architecture requires computing:

$$\text{for all bias sublayers: } \frac{\partial E}{\partial b_j^{(l)}} \text{ for } l=1, 2, \ldots, L-1$$

$$\text{for all rotational sublayers: } \frac{\partial E}{\partial \theta_{p,i}^{(l)}} \text{ for } l=1, 2, \ldots, L-1$$

$$\text{for all diagonal sublayers: } \frac{\partial E}{\partial t_j^{(l)}} \text{ for } l=1, 2, \ldots, L-1.$$

For a single $x_{in}=a^{(0)}$ sent through the VPNN, generating output $y_{out}=a^{(L)}$, the following terminology for partially forward-computed term can be used:

$$V_{left}^{(l)} = \prod_{j=1}^{k/2} R_j^{(l)} Q_j^{(l)}, \quad V_{right}^{(l)} = \prod_{j=k/2+1}^{k} R_j^{(l)} Q_j^{(l)}, \text{ and}$$

$$V^{(l)} = V_{left}^{(l)} D^{(l)} V_{right}^{(l)}$$

$$z^{(l)} = V^{(l)} a^{(l-1)} + b^{(l)} \text{ for } l = 1, 2, \ldots, L-1$$

$$a^{(l)} = A(z^{(l)}) \text{ for } l = 1, 2, \ldots, L-1$$

$$a^{(L)} = Z a^{(L-1)}$$

Where (for l=1, 2, ..., L−1):

$$\delta^{(l)} = \frac{\partial E}{\partial z^{(l)}} = \begin{bmatrix} \frac{\partial E}{\partial z_1^{(l)}} \\ \frac{\partial E}{\partial z_2^{(l)}} \\ \vdots \\ \frac{\partial E}{\partial z_{n_{in}}^{(l)}} \end{bmatrix}$$

The following backpropagation equations can be used to backpropagate completely through a layer. For any coupled activation function, as described herein:

For l=1, 2, 3, ..., L−1:

If $j$ is odd: $\delta_j^{(l)} =$ $$\left(V^{(l)T}\delta^{(l+1)}\right)_j \left(\frac{\partial C_1}{\partial x}\bigg|_{\substack{x=z_j^{(l)} \\ y=z_{j+1}^{(l)}}}\right) + \left(V^{(l)T}\delta^{(l+1)}\right)_{j+1} \left(\frac{\partial C_2}{\partial x}\bigg|_{\substack{x=z_j^{(l)} \\ y=z_{j+1}^{(l)}}}\right)$$

If $j$ is even: $\delta_j^{(l)} =$ $$\left(V^{(l)T}\delta^{(l+1)}\right)_{j-1} \left(\frac{\partial C_1}{\partial y}\bigg|_{\substack{x=z_{j-1}^{(l)} \\ y=z_j^{(l)}}}\right) + \left(V^{(l)T}\delta^{(l+1)}\right)_j \left(\frac{\partial C_2}{\partial y}\bigg|_{\substack{x=z_{j-1}^{(l)} \\ y=z_j^{(l)}}}\right)$$

where $C_1(x,y)$ is a first component of the coupled activation function and $C_2(x,y)$ is a second component.

In the case of singly parametrized coupled Chebyshev activation function, the partial derivatives can be simplified in terms of previously computed quantities:

$$\frac{\partial C_1}{\partial x} = \frac{1}{x^2 + y^2}[x \; My] C\left(\begin{bmatrix} x \\ y \end{bmatrix}\right) \frac{\partial C_2}{\partial x}$$

$$= \frac{1}{x^2 + y^2}[-My \; x] C\left(\begin{bmatrix} x \\ y \end{bmatrix}\right)$$

$$\frac{\partial C_1}{\partial y} = \frac{1}{x^2 + y^2}[y \; -Mx] C\left(\begin{bmatrix} x \\ y \end{bmatrix}\right) \frac{\partial C_2}{\partial y}$$

$$= \frac{1}{x^2 + y^2}[My \; y] C\left(\begin{bmatrix} x \\ y \end{bmatrix}\right)$$

In the case of doubly parametrized coupled Chebyshev activation function, the partial derivatives are:

$$\frac{\partial C_1}{\partial x} = \frac{1}{x^2 + y^2}[x \; \beta y] C\left(\begin{bmatrix} x \\ y \end{bmatrix}\right) \frac{\partial C_2}{\partial x}$$

$$= \frac{1}{x^2 + y^2}[-\beta y \; x] C\left(\begin{bmatrix} x \\ y \end{bmatrix}\right)$$

$$\frac{\partial C_1}{\partial y} = \frac{1}{x^2 + y^2}[y \; -\beta x] C\left(\begin{bmatrix} x \\ y \end{bmatrix}\right) \frac{\partial C_2}{\partial y}$$

$$= \frac{1}{x^2 + y^2}[\beta x \; y] C\left(\begin{bmatrix} x \\ y \end{bmatrix}\right)$$

The following equations allows for backpropagation through sublayers of a layer:

In non-output layers l=1, 2, ..., L−1, the bias parameters can have partial derivatives:

$$\frac{\partial E}{\partial b_j^{(l)}} = \delta_j^{(l)}$$

In the non-output layers l=1, 2, ..., L−1, the diagonal parameters can have partial derivatives:

$$\frac{\partial E}{\partial t_j^{(l)}} = \delta^{(l)T}\left(V_{left}^{(l)} F_j^{(l)} V_{right}^{(l)}\right) a^{(l-1)}$$

where $F_j^{(l)}$ is a diagonal matrix (of same size as $D^{(l)}$) whose j-th diagonal entry is $f'(t_j^{(l)})$ and whose j+1-th diagonal entry (modulo $n_{in}$) is $$-\frac{f(t_{j+1}^{(l)})}{f(t_j^{(l)})^2} f'(t_j^{(l)}),$$

and all other diagonal entries are zero.

In the non-output layers l=1, 2, ..., L−1, the rotational parameters can have partial derivatives:

for p=1, 2, ... k/2:

$$\frac{\partial E}{\partial \theta_{p,i}^{(l)}} = \delta^{(l)T}\left(\prod_{j=1}^{p-1} R_j^{(l)} Q_j^{(l)}\right) Z_i \left(\prod_{j=p}^{k/2} R_j^{(l)} Q_j^{(l)}\right) D^{(l)} V_{right}^{(l)} a^{(l-1)}$$

for $p = k/2 + 1, \ldots k$:

$$\frac{\partial E}{\partial \theta_p^{(l)}} = \delta^{(l)T} V_{left}^{(l)} D^{(l)} \left(\prod_{j=k/2+1}^{p-1} R_j^{(l)} Q_j^{(l)}\right) Z_i \left(\prod_{j=p}^{k} R_j^{(l)} Q_j^{(l)}\right) a^{(l-1)}$$

where $Z_i$ is the matrix with a 1 in the (2i−1,2i) entry, a −1 in the (2i, 2i−1) entry and all other entries are zero. This can be thought of as equivalent to inserting into the formula for $V^{(l)}$, before the location of rotation p, a new matrix which has a 2×2 rotation matrix $R_{\pi/2}$ in the block corresponding to parameter $\theta_{p,i}$ and zeroes elsewhere.

In some embodiments of the VPNN, there can be trainable parameters in coupled activation sublayers. It is generally not much more costly to allow the parameters M in the coupled activation sublayers, using coupled Chebyshev functions, to be trainable. In some cases, the coupled activation layers can be implemented as:

$$x = \begin{bmatrix} x_1 \\ x_2 \\ \vdots \\ \vdots \\ x_{n-1} \\ x_n \end{bmatrix} \xrightarrow{A} \begin{bmatrix} C_{M_1}\left(\begin{bmatrix} x_1 \\ x_2 \end{bmatrix}\right) \\ \vdots \\ \vdots \\ C_{M_{n/2}}\left(\begin{bmatrix} x_{n-1} \\ x_n \end{bmatrix}\right) \end{bmatrix}$$

where $M_1, M_2, \ldots, M_{n/2}$ are $n/2$ trainable parameters.

The derivatives, with respect to $M_i$, to be used in modified backpropagation equations are:

$$\frac{d}{dM_i} C_{M_i}\left(\begin{bmatrix} x \\ y \end{bmatrix}\right) = \begin{bmatrix} -\frac{1}{2M_i} & -\theta_{(x,y)} \\ \theta_{(x,y)} & -\frac{1}{2M_i} \end{bmatrix} C_{M_i}\left(\begin{bmatrix} x \\ y \end{bmatrix}\right)$$

where:

$$\theta_{(x,y)} = \text{sgn}(y)\cos^{-1}\left(\frac{x}{\sqrt{x^2 + y^2}}\right)$$

Allowing trainable parameters in the coupled activation sublayers can advantageously allow the VPNN to be trained to select an optimal amount of squashing in each direction in each activation layer; rather than have this amount fixed. Allowing trainable parameters can also, in some cases, allow for a lower minimum determined in the error function, and hence better approximation properties.

In the above embodiments with trainable parameters, the formulas for (doubly parametrized) Chebyshev activation functions can be:

$$\frac{\partial}{\partial \alpha} C_{(\alpha,\beta)}\left(\begin{bmatrix} x \\ y \end{bmatrix}\right) = \frac{1}{\alpha} C_{(\alpha,\beta)}\left(\begin{bmatrix} x \\ y \end{bmatrix}\right)$$

$$\frac{\partial}{\partial \beta} C_{(\alpha,\beta)}\left(\begin{bmatrix} x \\ y \end{bmatrix}\right) = \begin{bmatrix} 0 & -\theta_{(x,y)} \\ \theta_{(x,y)} & 0 \end{bmatrix} C_{(\alpha,\beta)}\left(\begin{bmatrix} x \\ y \end{bmatrix}\right)$$

where $$\theta_{(x,y)} = \text{sgn}(y)\cos^{-1}\left(\frac{x}{\sqrt{x^2 + y^2}}\right)$$

In further cases, the VPNN can use a different coupled activation function. Any area preserving function from $\mathbb{R}^2$ to $\mathbb{R}^2$ is generally suitable. In a particular case, shears can be used. Given two functions $f$ and $g$ from $\mathbb{R}$ to $\mathbb{R}$, two shears $\Sigma_{vert}$ and $\Sigma_{hor}$ can be constructed from $\mathbb{R}^2$ to $\mathbb{R}^2$ by shearing vertically by $f$ and/or horizontally by $g$:

$$\Sigma_{vert}(x,y)=(x,f(x)+y) \text{ and } \Sigma_{hor}(x,y)=(x+g(y),y)$$

Such maps, using shears, are area preserving and so could be used to construct coupled activation functions. Such coupled activation functions can include, for example, $f$ and/or $g$ as sigmoids or a Henon function. An advantage of using shears is that a Universality Theorem (in the sigmoid case) can be derived by approximating any standard neural network as part of a larger VPNN.

In further cases, the VPNN can use a tripled activation function by choosing a volume-preserving function from $\mathbb{R}^3$ to $\mathbb{R}^3$ and grouping the input vector into triplets.

In further cases, the VPNN can use an alternate parametrization for diagonal sublayers.

In further cases, the VPNN can use a fold in the coupled Chebyshev activation functions. If M is not an even integer, $C_M$ is not continuous on $\{(0,y):y \leq 0\}$. By incorporating a fold $F(x,y)=(x,|y|)$ (a reflection about the x axis) after C (so |y| is replaced by y, and sgn (y) removed), this activation function is continuous and still volume preserving.

In further cases, there can be a combination with other neural network layer components: pooling, convolution, and the like, as required for a particular dataset. In some cases, the input and output layers can be customized to the dataset under consideration.

In further cases, the product of rotations and permutations can be replaced by a general unitary. For example, the Tagare method can be used to inexpensively move along the gradient in the tangent space of the unitary surface. However, the VPNN described above usually will have finer control over the parameter space. In full unitary models, the number of parameters per layer is still on the order of $n_{in}^2$.

The present inventors conducted example experiments to demonstrate the utility and validate at least some of the advantages of the embodiments described herein. The example experiments were run on a consumer grade desktop computer with a 3 gb GPU executing the Ubuntu 16.04 operating system. In the example experiments, two standard datasets were used:

The MNIST dataset consisting of images (28×28 pixel greyscale) of 70,000 handwritten digits (60,000 for training and 10,000 for testing). The objective for this dataset is to determine the digit (from $\{0, 1, 2, 3, 4, 5, 6, 7, 8, 9\}$) from the image. Thus, the input vector had $n_{in}=28^2=784$ entries, and the output vector had $n_{out}=10$ entries.

The IMDB Dataset consisting of 25,000 movie reviews for training and the same number for testing. The objective with this dataset is to determine the sentiment (positive or negative) from the text. A preprocessed bag-of-words format provided with the database was used. Stopwords (for example: an, a, the, this, that, etc.) found in the Natural Language Toolkit's corpus were removed, and then used the 4000 most frequently used remaining words in the bag-of-words. Thus, the input vector had $n_{in}=4000$ and the output vector had $n_{out}=2$.

The example experiments considered six neural network models for comparison: three VPNN variants in accordance with the present disclosure, one standard model to act as a control, and two mixed models using features of both.

A VPNN with the first L−1 layers being volume preserving and made up of rotation, permutation, diagonal, and coupled Chebyshev activation sublayers as described herein; with the number of rotations in each layer equal to $2\lceil \log_2(n_{in}) \rceil$ and the Chebyshev parameter set to M=2 (referred to in the example experiments as "VPNN").

A VPNN with the first L−1 layers being volume preserving and made up of rotation, permutation, diagonal, and coupled Chebyshev activation sublayers as described herein; with the number of rotations in each layer equal to $2\lceil \log_2(n_{in}) \rceil$ and the Chebyshev parameter set to M=1.3 (referred to in the example experiments as "VPNN1.3").

A VPNN with the first L−1 layers being volume preserving and made up of rotation, permutation, diagonal, and coupled Chebyshev activation sublayers as described herein; with the number of rotations in each layer equal to $2\lceil \log_2(n_{in}) \rceil$ and the Chebyshev parameters are trainable, as described herein (referred to in the example experiments as "VPNNt").

A control ReLU neural network with the first L−1 layers using a standard affine sublayer, x→Wx+b, followed by a ReLU activation function (referred to in the example experiments as "S-ReLU").

A mixed neural network with the first L−1 layers using an affine sublayer, x→Wx+b, but also using coupled Chebyshev activation sublayers with M=1.3 (referred to in the example experiments as "Mixed1").

A mixed neural network with the first L−1 layers being volume preserving and made up of rotation, permutation and diagonal sublayers as described herein; with the number of rotations in each layer equal to $2\lceil \log_2(n_{in}) \rceil$ and the activation function is ReLU (referred to in the example experiments as "Mixed2").

The example experiments used stochastic gradient descent with momentum set to 0.9 and with a batch size of 100 in all training. For ease of comparison, all the models had L−1 layers of the same type which preserve dimension (so the number of neurons in each of the first L layers is equal to $n_{in}$, the number of input neurons) followed by a fixed downsizer matrix Z. For testing accuracy, L=4 was used, and for testing learning throughout the layers, L=10 was used.

When testing for accuracy (L=4), a variation of adaptive learning methods were used in the example experiments: preliminary runs (with a small number of batches) with larger learning rates were run to determine stability, and an initial learning rate of 1/10 of the limit where training seems stable was used. Thus, for the first half of the training, the learning rates are in the range of 0.1 to 1.0; then, as the training has approximately zeroed in on the minimum, the learning rate is set to 0.01 for all models. When testing for learning throughout the layers (L=10), the learning rate was held at 0.01 for all models.

A cross-entropy loss function was used as the error function:

$$E(y, \hat{y}) = -\sum_i \hat{y}_i \log(y_i)$$

where y is the predicted output for input x and ŷ is the actual output.

Using a four layer network and running 30 epochs for MNIST and 40 epochs for IMDB, the example experiments obtained the training times and accuracy rates as shown in TABLE 1.

TABLE 1

|  | MNIST | | IMDB | |
|---|---|---|---|---|
| Model | Training Time | Accuracy | Training Time | Accuracy |
| VPNN | 29 s/epoch | 98.06% | 27 s/epoch | 86.89% |
| VPNN1.3 | 29 s/epoch | 97.21% | 27 s/epoch | 87.46% |
| VPNNt | 29 s/epoch | 97.38% | 27 s/epoch | 83.89% |
| S-ReLU | 6 s/epoch | 97.42% | 14 s/epoch | 86.35% |
| Mixed1 | 7 s/epoch | 98.40% | 15 s/epoch | 87.16% |
| Mixed2 | 27 s/epoch | 96.00% | 25 s/epoch | 83.90% |

Figure 5:
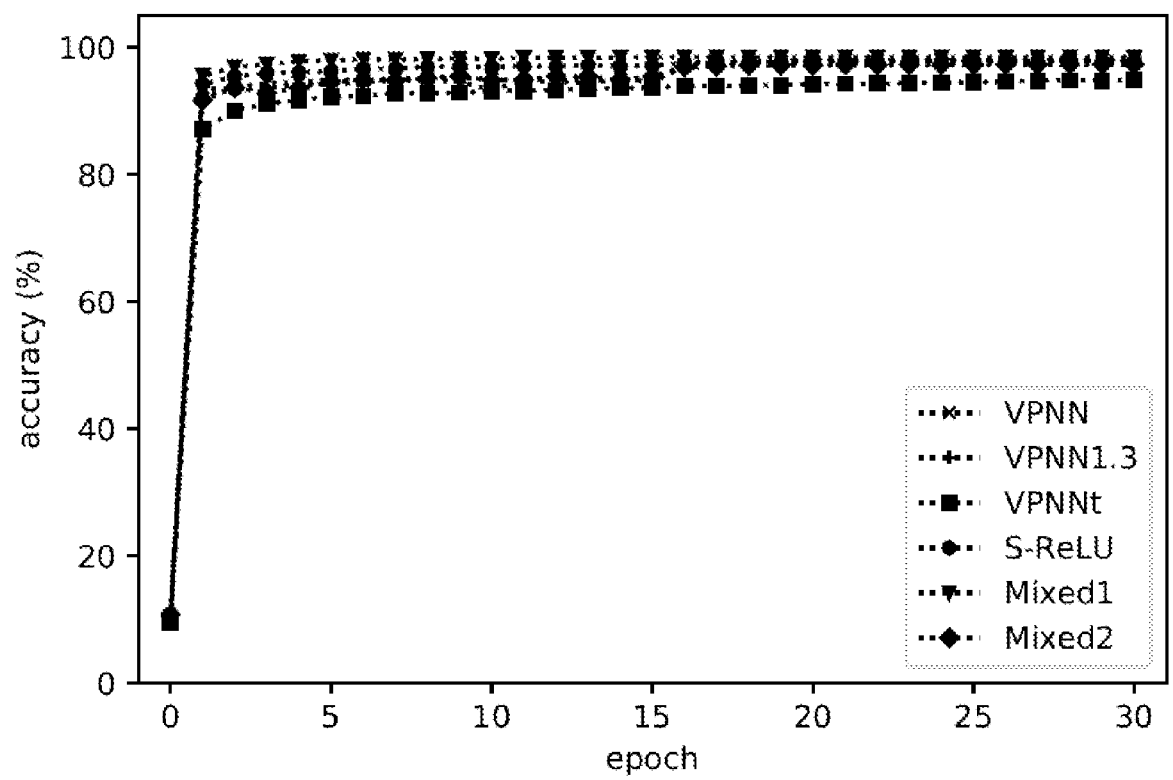
FIG. 5 is a chart illustrating results of an example experiment using the system of FIG. 1 on a MNIST dataset.
Figure 6:
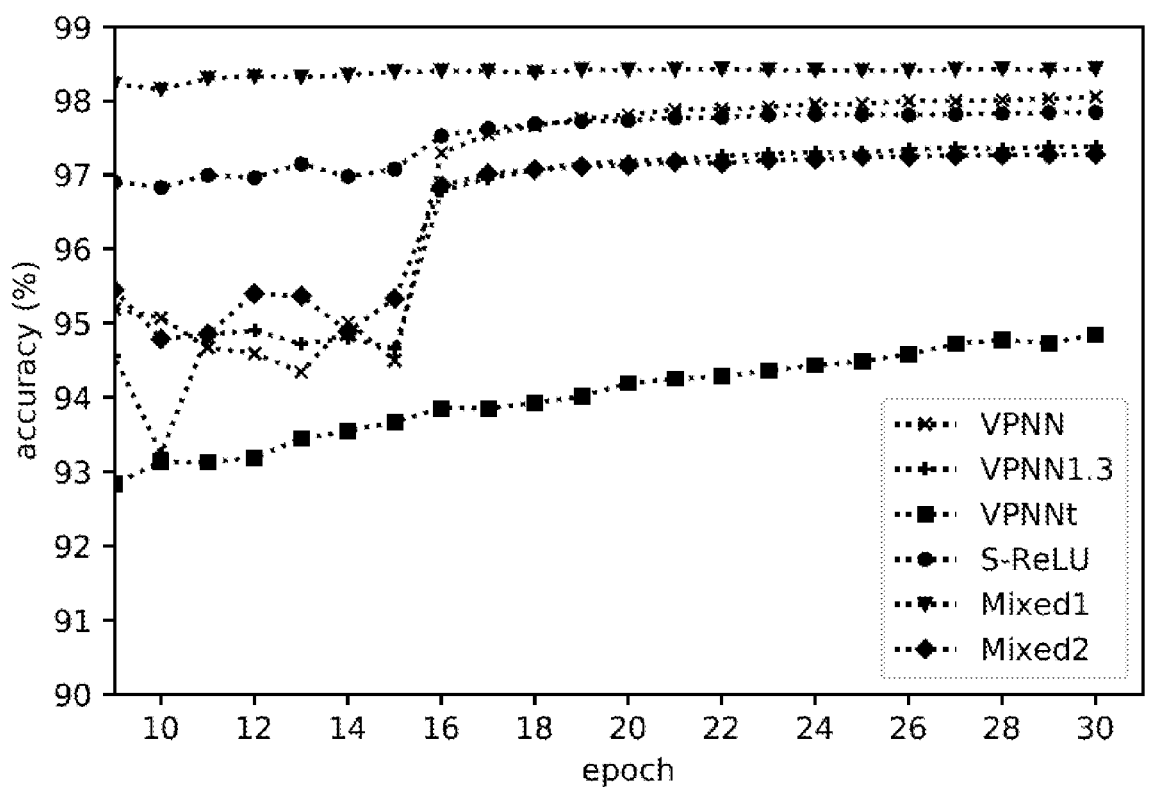
FIG. 6 is a chart illustrating a zoomed-in portion of the chart of FIG. 5.
Figure 7:
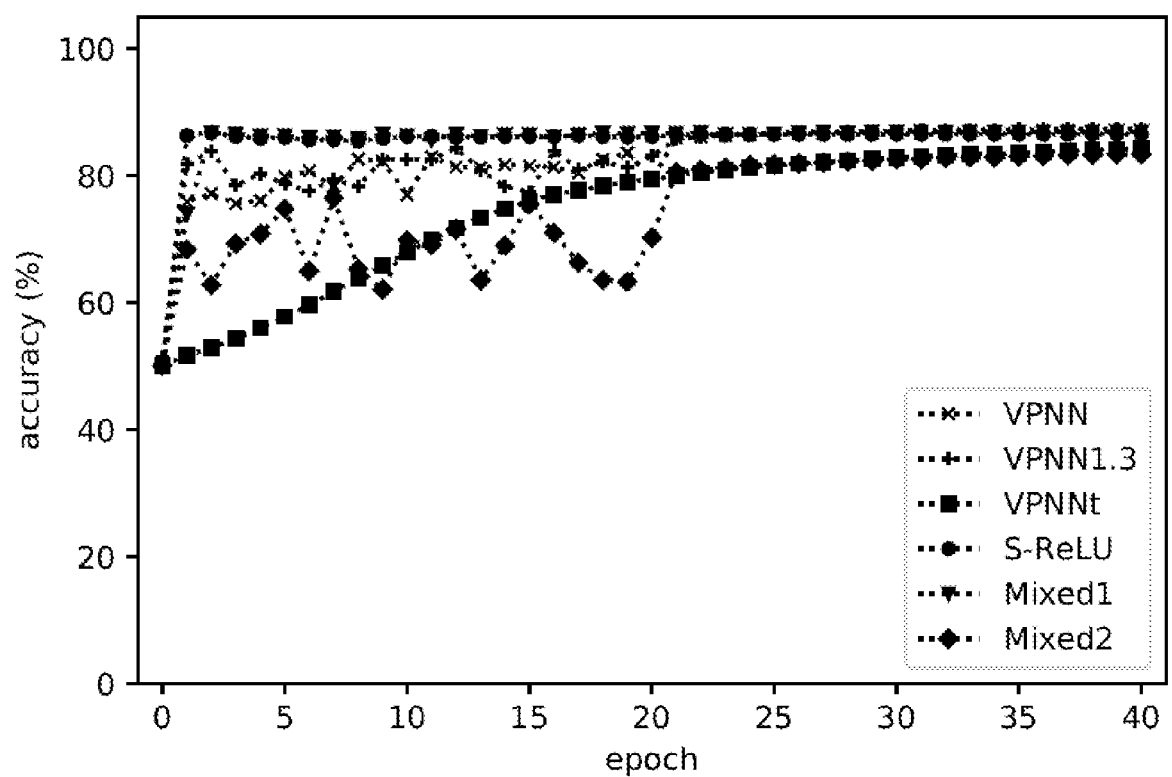
FIG. 7 is a chart illustrating results of an example experiment using the system of FIG. 1 on an IMDB dataset.
Figure 8:
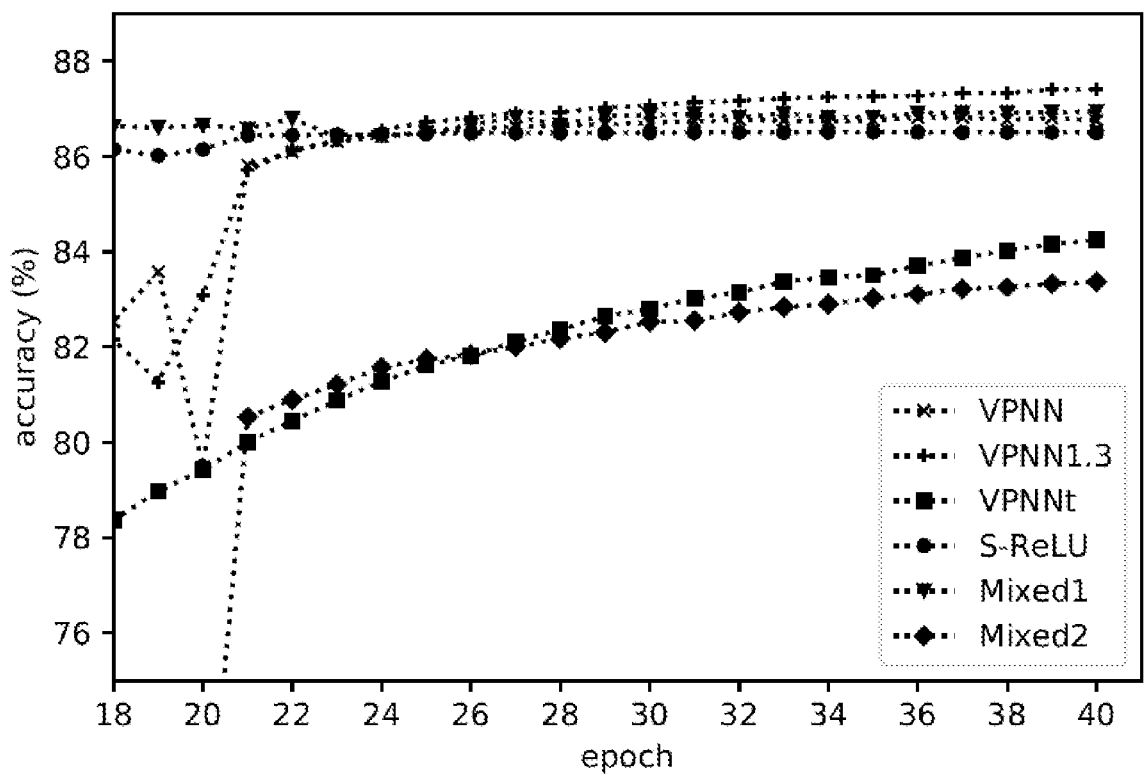
FIG. 8 is a chart illustrating a zoomed-in portion of the chart of FIG. 7.
Figure 9:
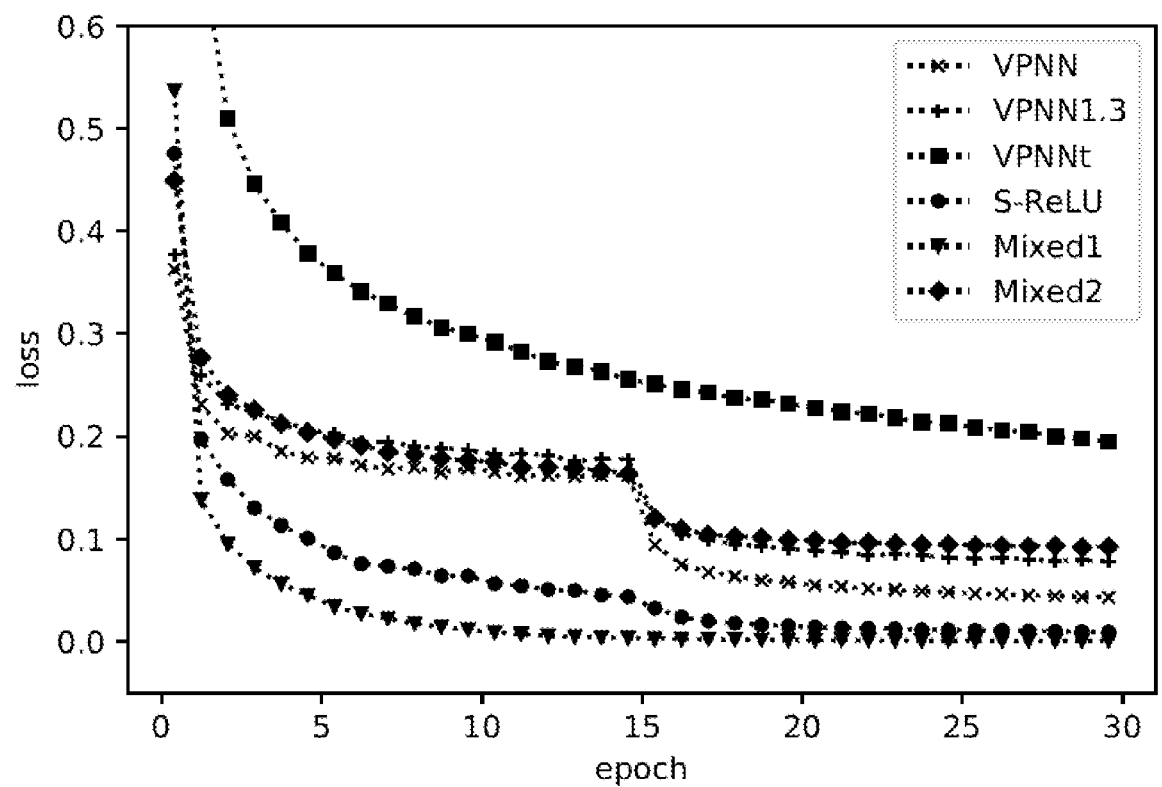
FIG. 9 is a chart illustrating performance in terms of minimizing the error function for the example experiment of FIG. 5.
Figure 10:
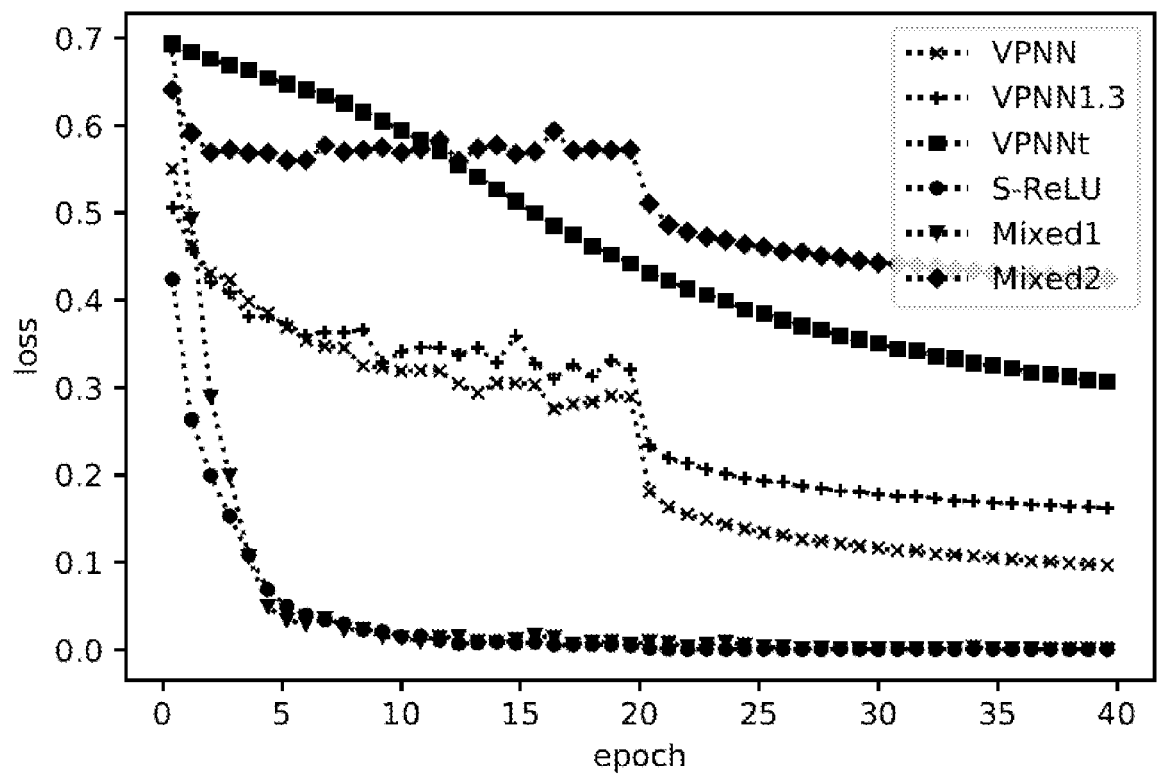
FIG. 10 is a chart illustrating performance in terms of minimizing the error function for the example experiment of FIG. 7.

FIGS. 5 and 6 for MNIST, and FIGS. 7 and 8 for IMDB, show charts of the progression of the measure of accuracy throughout the training. Where FIGS. 6 and 8 are zoomed in portions of FIGS. 5 and 7 respectively. FIGS. 9 and 10 illustrate charts showing performance in terms of minimizing the error function for MNIST and IMDB respectively.

The training times for the models are comparable, which is advantageous considering all the trigonometric evaluations in the VPNN model. The swings in accuracy early in the training are likely due to the large learning rate; which can be smoothed with a smaller learning rate, and thus more epochs.

One factor that should be taken into consideration is the number of parameters in the various models. Fully-connected layer models (like S-ReLU) use w(w+1) parameters per layer of width w, versus $w(\lceil \log_2(w) \rceil + 2)$ parameters per layer VPNN2 and VPNN1.3 (or $w(\lceil \log_2(w) \rceil + 5/2)$ for VPNNt). For the VPNN models, $w=n_{in}$. TABLE 2 shows the number of parameters per layer for the different models:

TABLE 2

| Model | MNIST | IMDB |
|---|---|---|
| VPNN | $9.4 \times 10^3$ | $5.6 \times 10^4$ |
| VPNN1.3 | $9.4 \times 10^3$ | $5.6 \times 10^4$ |
| VPNNt | $9.8 \times 10^3$ | $5.8 \times 10^4$ |
| S-ReLU | $6.2 \times 10^5$ | $1.6 \times 10^7$ |
| Mixed1 | $6.2 \times 10^5$ | $1.6 \times 10^7$ |
| Mixed2 | $9.4 \times 10^3$ | $5.6 \times 10^4$ |

Especially for datasets where each datapoint has a large number of entries, the number of parameters is dramatically lower for VPNN implementations than for other neural networks.

In further example experiments, to test the present embodiments handling of the vanishing gradient problem, the amount of learning throughout the layers for the various models was considered. This can be used to show how well the VPNNs control the gradient in deep neural networks and allow for learning in all layers roughly equally. The magnitude of the vectors $\delta^{(l)}$ are a measure of this learning, as they indicate how well the parameter updating has propagated back to the l-th layer. If there are vanishing gradients, one would expect $\|\delta^{(l)}\|$ to be small for early layers (l close to 1) compared to later $\|\delta^{(l)}\|$ (l close to L) as the training progresses. If there are exploding gradients, one would expect the reverse. If all are comparable in size, then there is ideal backpropagation.

For testing learning throughout the layers, deeper neural networks were used where L=10 layers. In this way, there are 9 layers of volume-preserving or standard type, followed by a fixed matrix downsizer output layer. Since these example experiments are not testing accuracy, only three epochs were run and the norms of the vectors $\delta^{(l)}$ were collected at this stage. As it is the comparison of the order of magnitude (rather than the exact value) of the gradients across the layers that is generally relevant, the example experiments consider the $\log_{10}$ of the learning amount in each layer compared to $\log_{10}$ of the learning amount in the final layer for each of the models. As such, the example experiments plot:

$$y = \log_{10}\left(\frac{\|\delta^{(l)}\|}{\|\delta^{(L)}\|}\right) = \log_{10}(\|\delta^{(l)}\|) - \log_{10}(\|\delta^{(L)}\|)$$

for l=1, 2, 3, . . . , L. Thus, for a given l, 10 raised to the corresponding value of y gives the percentage more or less of learning in that layer as compared to layer L.

Figure 11:
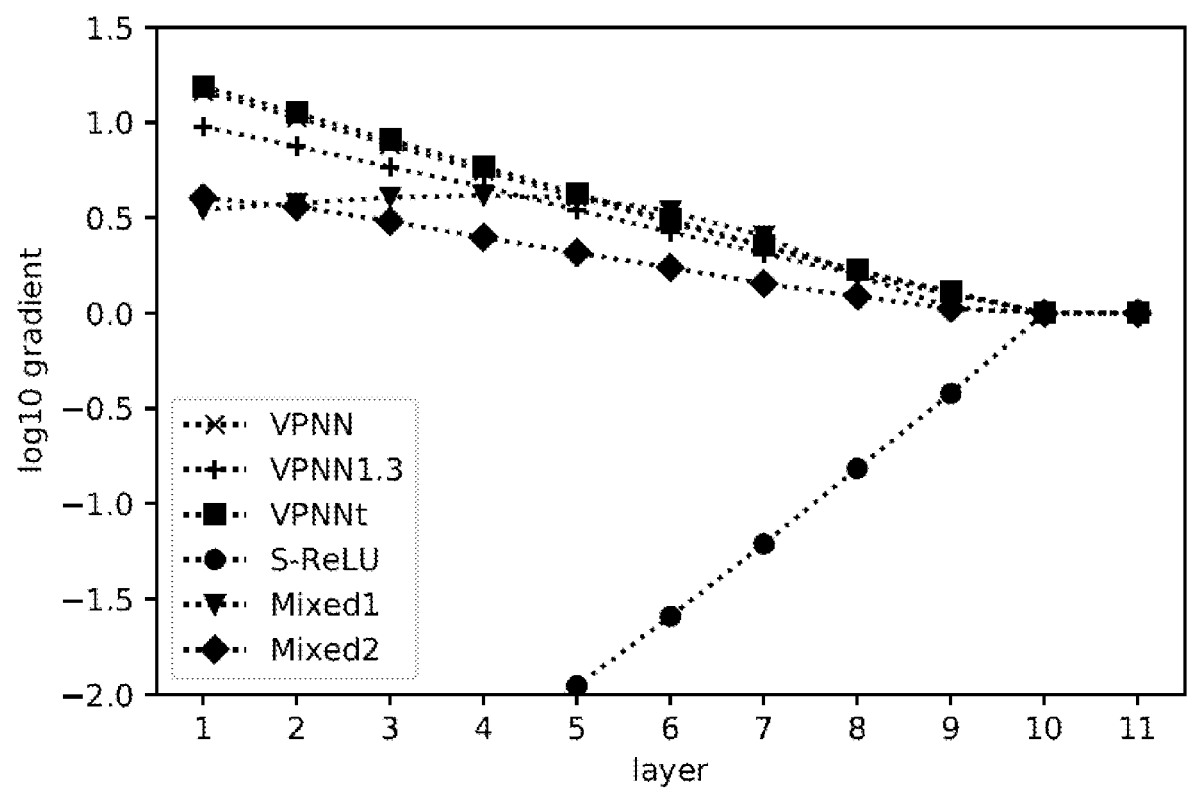
FIG. 11 is a chart illustrating learning in the layers for the example experiment of FIG. 5.
Figure 12:
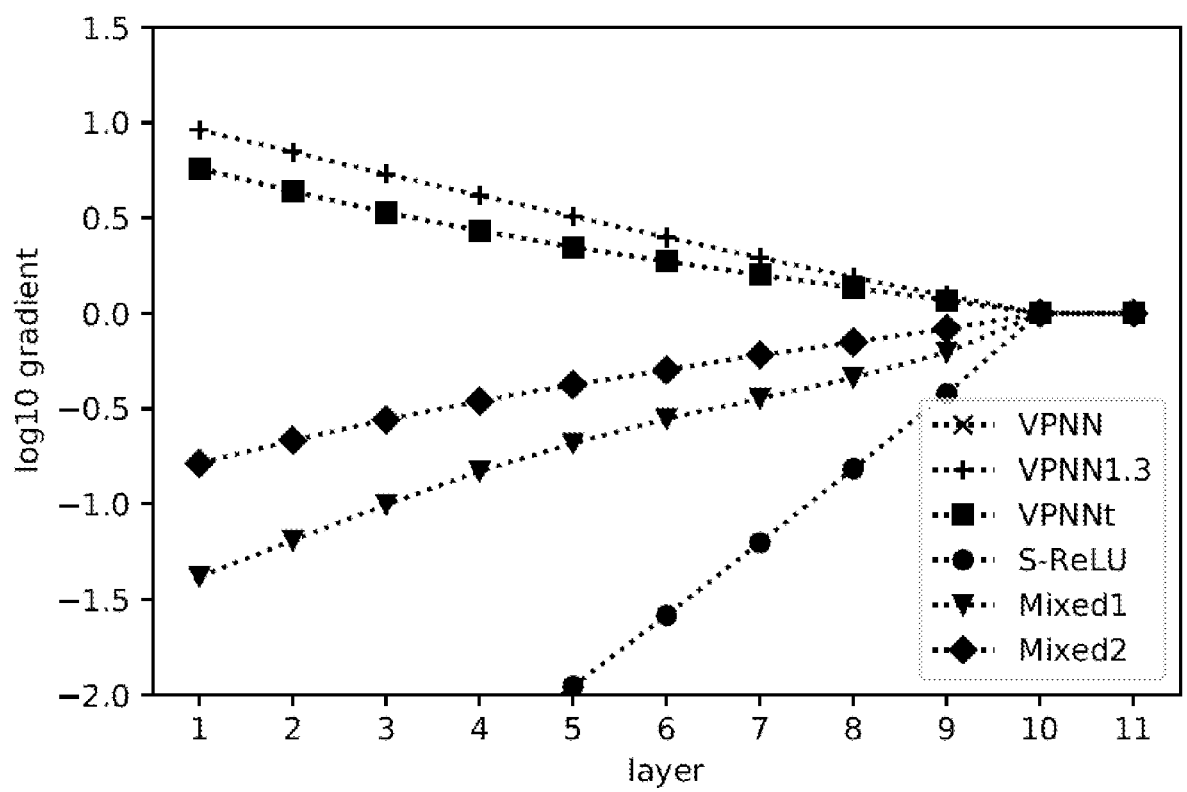
FIG. 12 is a chart illustrating learning in the layers for the example experiment of FIG. 7.

FIG. 11 is a chart illustrating learning in the layers for the MNIST database and FIG. 12 is a chart illustrating learning in the layers for the IMDB database. In these charts, a positive slope indicates vanishing gradients. More precisely, a slope of m on these graphs indicates that learning decreases (when m is positive) or increases (when m is negative) by a factor of $10^{-m}$ for each layer deeper we go into the neural network. For S-ReLU, in both FIGS. 11 and 12, the slope is approximately 0.4; so for every layer retreat into the network, the gradients (and hence the amount of learning) decreases by (approximately) a factor of $10^{-0.40}$=0.40. Thus, in layer 1, there is roughly $(0.40)^9 \approx 2.6 \times 10^{-4}$ as much learning as in layer 10; almost all the learning is in the later layers. In contrast, with VPNN models, learning is comparable across all the layers; and in some cases, there is slightly more learning in early layers than in later layers. The mixed models show learning throughout the layers superior to S-ReLU but inferior to the VPNN models. Thus, the VPNN variants show substantially better learning throughout the layers, with no appearance of a vanishing gradient.

Advantageously, the present embodiments provide a volume preserving neural network architecture with volume preserving coupled activation functions, and without having to resort to adding extra complexity, such as having extra complex parameters.

Advantageously, in some cases, computational resources can be saved because many of the values needed for the backward pass are already determined on the forward pass and can be saved and reused.

Although the invention has been described with reference to certain specific embodiments, various modifications thereof will be apparent to those skilled in the art without departing from the spirit and scope of the invention as outlined in the claims appended hereto.

The invention claimed is:

1. A method for generating and executing a trained volume-preserving artificial neural network, on one or more processors, the one or more processors in communication with a data storage, the method comprising: receiving, by the one or more processors, the input data at an input layer of the volume-preserving neural network; processing, by the one or more processors, the input data in sequentially connected volume-preserving hidden layers which are intermediate the input layer and a downsizing output layer, and outputting, by the one or more processors, the output at the downsizing output layer of the volume-preserving artificial neural network to the data storage, wherein the volume-preserving artificial neural network comprises:
the input layer to receive the input data;
the sequentially connected volume-preserving hidden layers to perform operations on the input data to address vanishing gradients or exploding gradients for artificial neural networks, the first hidden layer connected to the input layer, each hidden layer comprising:
at least $2*\lceil \log_2(n_{in}) \rceil$ volume-preserving rotation sublayers, where $n_{in}$ is the number of inputs to the rotation sublayer;
at least $2*\lceil \log_2(n_{in}) \rceil$ volume-preserving permutation sublayers, where $n_{in}$ is the number of inputs to the permutation sublayer;
one or more volume-preserving diagonal sublayer;
a volume-preserving activation sublayer comprising a grouped activation function acting on a grouping of input variables provided to the volume-preserving activation sublayer; and
the downsizing output layer connected to the activation sublayer of the last hidden layer to downsize and output the received output from the activation sublayer as the output of the volume-preserving neural network.

2. The method of claim 1, wherein each of the volume-preserving rotation sublayers comprises rotation matrices that each rotate a vector in a counter-clockwise direction.

3. The method of claim 1, wherein each of the volume-preserving permutation sublayers comprise a permutation matrix that is chosen randomly prior to training of the volume-preserving artificial neural network.

4. The method of claim 1, wherein each of the volume-preserving diagonal sublayers comprises a diagonal matrix comprising diagonal entries that are positive and have a product equal to one.

5. The method of claim 1, wherein each of the volume-preserving diagonal sublayers comprises trainable parameters, where each trainable parameter is involved in two neuron connections and where each input neuron connects to one output neuron.

6. The method of claim 1, wherein the grouped activation function comprises a coupled Chebyshev activation function.

7. The method of claim 6, wherein the coupled Chebyshev activation function is implemented with a reflection function.

8. The method of claim 1, wherein the one or more volume-preserving rotation sublayers, the one or more volume-preserving permutation sublayers, and the one or more volume-preserving diagonal sublayers combine to perform a volume-preserving linear transformation V given by:

$$V = \left(\prod_{j=1}^{k/2} R_j Q_j\right) D \left(\prod_{j=k/2+1}^{k} R_j Q_j\right);$$

where D is a diagonal matrix used in the diagonal sublayers, Q is a permutation matrix used in the permutation sublayers, R is a rotation matrix used in the rotation sublayers, and k is a number of rotations or permutations used in each of the hidden layers, where $k=2\lceil \log_2(n_{in}) \rceil$ and $n_{in}$ is the number of inputs to the hidden layer.

9. A system for generating and executing a trained volume-preserving artificial neural network, the system comprising one or more processors in communication with a data storage, the one or more processors configured to execute the volume-preserving artificial neural network comprising:
an input module to receive the input data at an input layer of the volume-preserving neural network;
a transformation module to process the input data in sequentially connected volume-preserving hidden layers intermediate the input layer and a downsizing output layer, the sequentially connected volume-preserving hidden layers perform operations on the input data to address vanishing gradients or exploding gradients for artificial neural networks, the first hidden layer connected to the input layer, each hidden layer comprising:
at least $2*\lceil \log_2(n_{in}) \rceil$ volume-preserving rotation sublayers, where $n_{in}$ is the number of inputs to the rotation sublayer;
at least $2*\lceil \log_2(n_{in}) \rceil$ volume-preserving permutation sublayers, where $n_{in}$ is the number of inputs to the permutation sublayer;
one or more volume-preserving diagonal sublayers; and a volume-preserving activation sublayer comprising a grouped activation function acting on a grouping of input variables provided to the volume-preserving activation sublayer;

an architecture module to utilize the downsizing output layer connected to the last sequentially connected volume-preserving hidden layer; and output the received output from the downsizing output layer as the output of the volume-preserving neural network.

10. The system of claim 9, wherein each of the volume-preserving rotation sublayers comprises rotation matrices that each rotate a vector in a counter-clockwise direction.

11. The system of claim 9, wherein each of the volume-preserving permutation sublayers comprise a permutation matrix that is chosen randomly prior to training of the volume-preserving artificial neural network.

12. The system of claim 9, wherein each of the volume-preserving diagonal sublayers comprises a diagonal matrix comprising diagonal entries that are positive and have a product equal to one.

13. The system of claim 9, wherein each of the volume-preserving diagonal sublayers comprises trainable parameters, where each trainable parameter is involved in two neuron connections and where each input neuron connects to one output neuron.

14. The system of claim 9, wherein the grouped activation function comprises a coupled Chebyshev activation function.

15. The system of claim 14, wherein the coupled Chebyshev activation function is implemented with a reflection function.

* * * * *